(12) United States Patent
Lee et al.

(10) Patent No.: US 11,264,818 B2
(45) Date of Patent: Mar. 1, 2022

(54) BATTERY CHARGER FOR MULTIPLE BATTERY PACKS

(71) Applicant: TTI (MACAO COMMERCIAL OFFSHORE) LIMITED, Macau (MO)

(72) Inventors: Hei Man Raymond Lee, Kwai Chung (CN); Yong Min Li, Dongguan (CN); Ming Jun Zhuang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 206 days.

(21) Appl. No.: 16/329,101

(22) PCT Filed: Jul. 4, 2018

(86) PCT No.: PCT/CN2018/094467
§ 371 (c)(1),
(2) Date: Feb. 27, 2019

(87) PCT Pub. No.: WO2020/006701
PCT Pub. Date: Jan. 9, 2020

(65) Prior Publication Data
US 2020/0185941 A1    Jun. 11, 2020

(51) Int. Cl.
*H02J 7/00* (2006.01)
*H01M 10/42* (2006.01)
(52) U.S. Cl.
CPC ....... *H02J 7/0045* (2013.01); *H01M 10/4257* (2013.01)
(58) Field of Classification Search
CPC .... H02J 7/0042; H02J 7/0045; H02J 7/00047; B25F 5/00; H01M 10/4257; Y02E 60/10
(Continued)

(56) References Cited

U.S. PATENT DOCUMENTS

2008/0311795 A1* 12/2008 Brotto ............... H01M 10/48
439/628
2008/0315832 A1* 12/2008 Kondo ............... H02J 7/0045
320/110
(Continued)

FOREIGN PATENT DOCUMENTS

| CN | 201608256 U | 10/2010 |
| CN | 106160037 A | 11/2016 |
| CN | 206865165 U | 1/2018 |

OTHER PUBLICATIONS

International Search Report and Written Opinion for Application No. PCT/CN2018/094467 dated Mar. 29, 2019, 9 pages.

*Primary Examiner* — Paul Dinh
(74) *Attorney, Agent, or Firm* — Michael Best & Friedrich LLP

(57) ABSTRACT

A charger adapted to charge either one of a first battery pack and a second battery pack. The first battery pack and the second battery pack have respectively a first interface and a second interface being substantially different from each other. The charger includes a housing having a receiving area in which the first battery pack and the second battery pack can be selectively received in such a way that the first battery pack is accommodated in a first region and the second battery pack is accommodated in a second region. The receiving area is at least partially defined by the first region partially overlapping the second region. The charger according to the invention is adapted to charge more than one type of battery pack, which saves cost and space needed for two separate chargers.

14 Claims, 4 Drawing Sheets

(58) Field of Classification Search
USPC .................................................. 320/102, 112
See application file for complete search history.

(56) References Cited

U.S. PATENT DOCUMENTS

| | | | |
|---|---|---|---|
| 2009/0147451 A1* | 6/2009 | Yeh | G06F 1/1683 361/679.01 |
| 2011/0198103 A1* | 8/2011 | Suzuki | B25F 5/00 173/46 |
| 2015/0367658 A1* | 12/2015 | Mashima | B41J 11/06 347/104 |
| 2017/0346302 A1 | 11/2017 | Hunger | |
| 2018/0278071 A1* | 9/2018 | Murakami | H02J 7/0045 |

* cited by examiner

BATTERY CHARGER FOR MULTIPLE BATTERY PACKS

TECHNICAL FIELD

The present invention relates to battery chargers. Particularly, the invention relates to a battery charger which is adapted to charge more than one type of battery packs.

BACKGROUND OF THE INVENTION

Many electric appliances such as cordless power tools powered by detachable battery packs are widely used. Rechargeable battery cells, which can be recharged multiple times by a charger, are installed in the battery pack used in this type of power tools.

For cordless power tools, there are a wide variety of commercially available designs for removable, rechargeable battery pack power supplies. These Battery packs are designed with various shapes and dimensions and they are readily received in the electric tools in which they are used. As a result, an exclusive charger is provided respectively for each type of battery packs. Accordingly, in the case where a user uses different types of electric tools, he/she must selectively use various types of chargers. Recently there has been a trend by individual manufacturers to increase the standardization of power packs from the same manufacturer, so that a single battery pack can be used in a variety of power tools.

SUMMARY OF THE INVENTION

Compared with prior art, it is therefore an objective of the present invention to provide a battery charger for a plurality of battery pack designs, which has a single receiving area sized and shaped to accommodate one of a plurality of battery pack designs having different sizes and shapes, voltage and capacities and (2) automatically adapted to receive alternate pack designs upon placing the alternate pack.

According to the invention, there is provided in one aspect a charger adapted to charge either one of a first battery pack and a second battery pack. The first battery pack and the second battery pack have respectively a first interface and a second interface being substantially different from each other. The charger includes a housing having a receiving area in which the first battery pack and the second battery pack can be selectively received in such a way that the first battery pack is accommodated in a first region and the second battery pack is accommodated in a second region. The receiving area is at least partially defined by the first region partially overlapping the second region.

Preferably, the first region and the second region respectively accommodate the first battery pack and the second battery pack in a first orientation and a second orientation. The second orientation is substantially parallel to a top side of the charger and the first orientation is substantially perpendicular to the second orientation.

More preferably, the charger further includes a cavity accessible from the top side. The cavity has a depth in parallel with the first orientation, and the cavity is adapted to receive a portion of first battery pack.

According to a variation of the preferred embodiments, the charger further contains a first set of electrical contacts exposed to the first region and adapted to electrically contact with corresponding terminals on the first battery when the first battery is completely received in the receiving area, and a second set of electrical contacts exposed to the second region and adapted to electrically contact with corresponding terminals on the second battery when the second battery is completely received in the receiving area. The first set of electrical contacts is located in the cavity.

In one specific implementation, the charger further contains a charging control circuit housed in the housing. The control circuit is adapted to retrieve status information of the first battery pack or the second battery pack received in the receiving area, and to control a charging process depending on the detected status information.

In another aspect of the present invention, there is disclosed a kit containing a first battery pack, a second battery pack, and a charger.

Preferably, the first battery pack and the second battery pack are configured for use in power tools.

More preferably, the first battery pack and the second battery pack have a rated voltage of 18V and 36V respectively.

The present invention therefore provides several advantages over conventional battery pack chargers. By having more than one interface on the same charger for adapting more than one type of battery pack, the charger according to the present invention can support multiple types of battery packs without the need for extra hardware or any modification to the battery pack. Rather, the charger is compatible after-market with existing battery packs that were designed and manufactured for their corresponding, dedicated chargers. With the charger the user does not need to take two battery chargers along with him/her for using the multiple types of battery packs, and in turn multiple types of power tools. A single charger would not only save cost and weight, but also it reduces spaces needed for storing the otherwise multiple chargers.

In addition, the charger according to some embodiments of the invention features an automatic battery recognition. A suitable charging voltage/current will be supplied to a particular battery interface once the corresponding battery pack is detected to be inserted and connected. As a result, the user does not need to have any particular knowledge for using existing battery packs with the charger, but the charger itself will determine the type of inserted battery pack and choose the best charging strategy.

Those skilled in the art will appreciate that the invention described herein is susceptible to variations and modifications other than those specifically described. The invention includes all such variations and modifications. The invention also includes all steps and features referred to or indicated in the specification, individually or collectively, and any and all combinations of the steps or features.

Other features and aspects of the invention will become apparent by consideration of the following detailed description and accompanying drawings.

BRIEF DESCRIPTION OF THE DRAWINGS

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE INVENTION

Unless otherwise defined, all technical terms used herein have the same meaning as commonly understood by one skilled in the art to which the invention belongs.

As used herein, "comprising" means including the following elements but not excluding others. "Essentially consisting of" means that the material consists of the respective element along with usually and unavoidable impurities such as side products and components usually resulting from the respective preparation or method for obtaining the material such as traces of further components or solvents. "Consisting of" means that the material solely consists of, i.e. is formed by the respective element. As used herein, the forms "a," "an," and "the," are intended to include the singular and plural forms unless the context clearly indicates otherwise.

Figure 1:
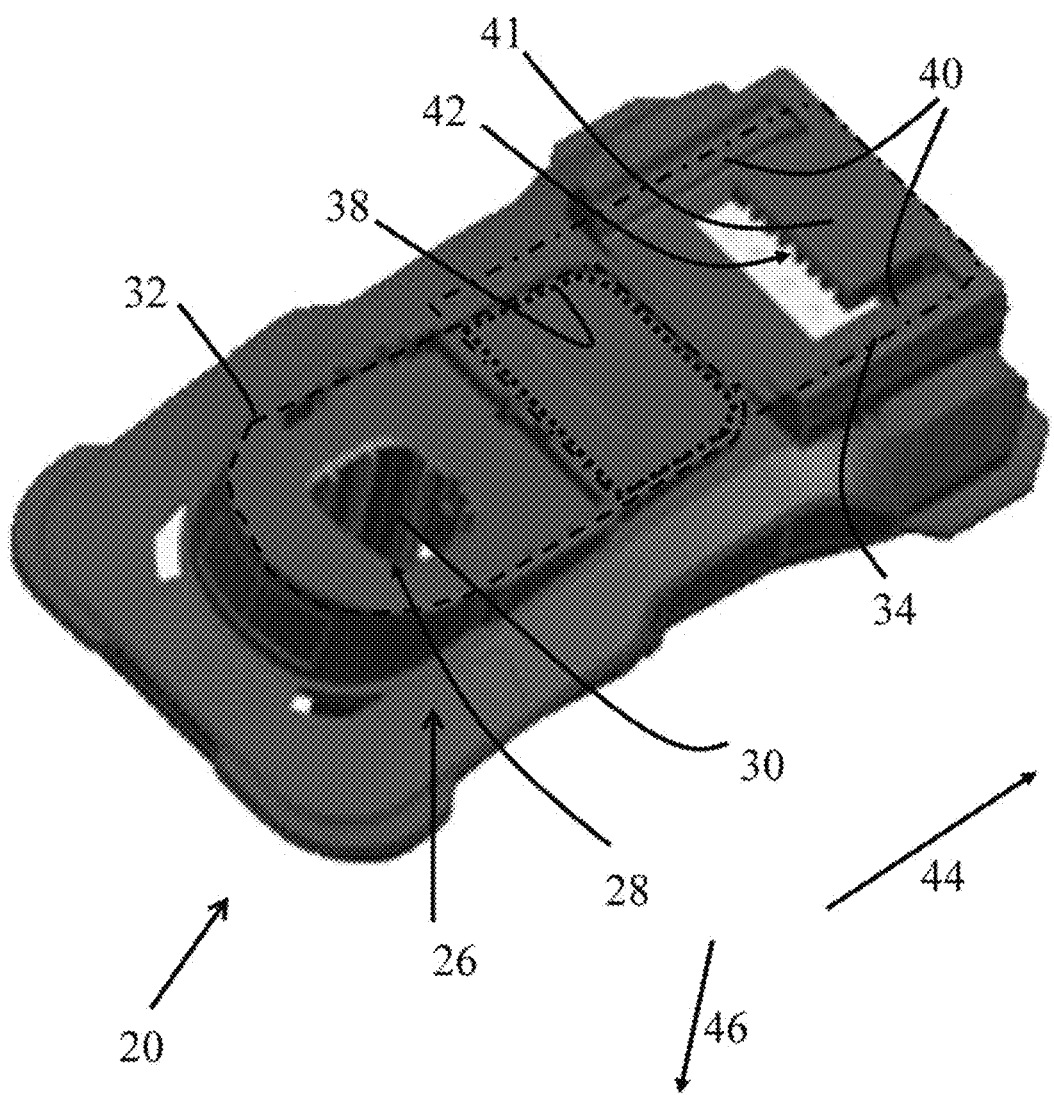
FIG. 1 shows a battery charger adapted to charge a first battery pack and second battery pack according to an embodiment of the present invention.

As illustrated in FIG. 1, the present invention in one embodiment is directed to a charger 20 adapted to charge either one of a first battery pack and a second battery pack (both not shown). The first battery pack and the second battery pack are rechargeable battery packs having a first interface and a second interface (both not shown) respectively which are substantially different from each other. In correspondence, the charger 20 contains two configurations for mating with the interfaces of the first battery pack and second battery pack. In particular, the charger 20 contains a housing which has a top side 26. For the sake of brevity other portions of the housing is not shown in FIG. 1. The housing has a receiving area in which the first battery pack or the second battery pack can be selectively received in such a way that the first battery pack is accommodated in a first region 32 and the second battery pack is accommodated in a second region 34. The receiving area is defined by the first region 32 partially overlapping with the second region 34. With the receiving area defined by the first and second regions 32, 34, the battery charger 20 therefore is adapted to recharge two different types of battery packs, although not simultaneously.

By saving that the first region 32 is partially overlapping the second region 34, it means that receiving area has a partial area 38 for commonly accepting a part of the first battery pack and a part of the second battery pack, though not simultaneously. In accepting the first battery pack into the first region 32 and in accepting the second battery pack into the second region 34, parts of the first battery pack and the second battery pack fit into the partial area 38. That is, the partial area 38 overlappingly accepts the first battery pack and the second battery pack. As a result the size of the charger can be reduced. Further, both the first region 32 and the second region 34 have a substantially rectangular shape and they are aligned along a straight-line direction on the charger 20, with the partial overlapping mentioned above.

Each of the first region 32 and the second region 34 further contains electrical terminals necessary for electrically coupling with the first battery pack and the second battery pack by the charger 20 respectively. The electrical terminals are configured outside of the partial area 38. In particular, a first set of electrical contacts (not shown) is configured within a cavity 30 formed on the top side 26 of the charger 20. The cavity 30 is accessible from the top side 26 through an opening 28. A depth of the cavity 30 is parallel to an intended insertion direction of a first battery pack to the charger 20, which is denoted by the arrow 46. The first set of electrical contacts is therefore exposed to the first region 32 and adapted to electrically contact with corresponding terminals on the first battery when the first battery is completely received in the receiving area.

On the other hand, a second set of electrical contacts (not shown are configured in a connection block 41 formed on the top side 26 of the charger 20. The connection block 41 contains a plurality of openings 42 allowing corresponding electrical terminals on a second battery pack (not shown to be inserted into the connection block 41. The intended insertion direction of a second battery pack to the charger 20 is denoted by the arrow 44. One can see that the insertion directions of the first battery pack and the second battery pack when they are to be accommodated respectively by the first region 32 and the second region 34, are therefore substantially perpendicular to each other in this embodiment. On the two sides of the connection block 41, there are formed two ribs 40 protruding from features on the top side 26 of the charger 20. The two ribs 40 are adapted to be received in corresponding slots on a battery pack (not shown) and thus secure the battery pack to the charger 20.

Figure 2:
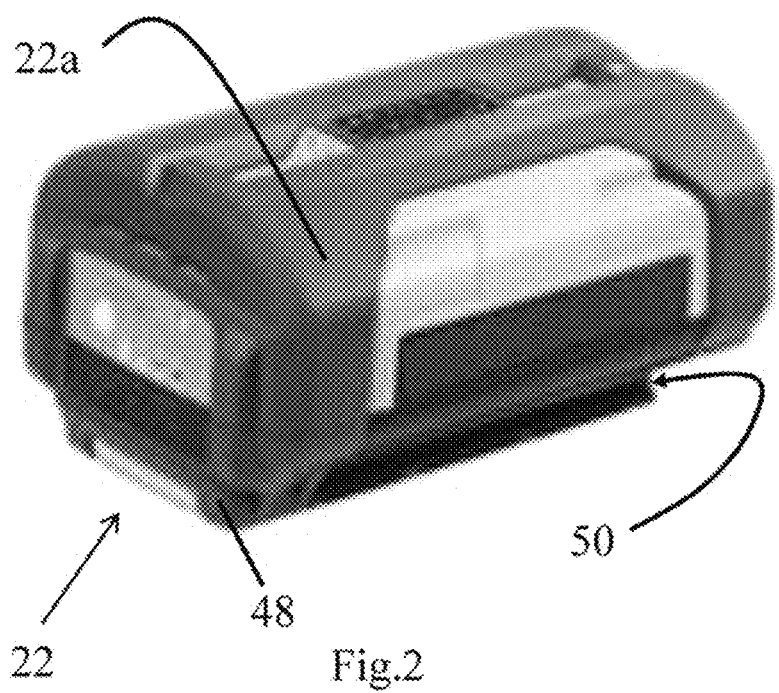
FIG. 2 and FIG. 3 show respectively a first battery pack and a second battery pack that can be received and charged by the battery charger in FIG. 1.
Figure 3:
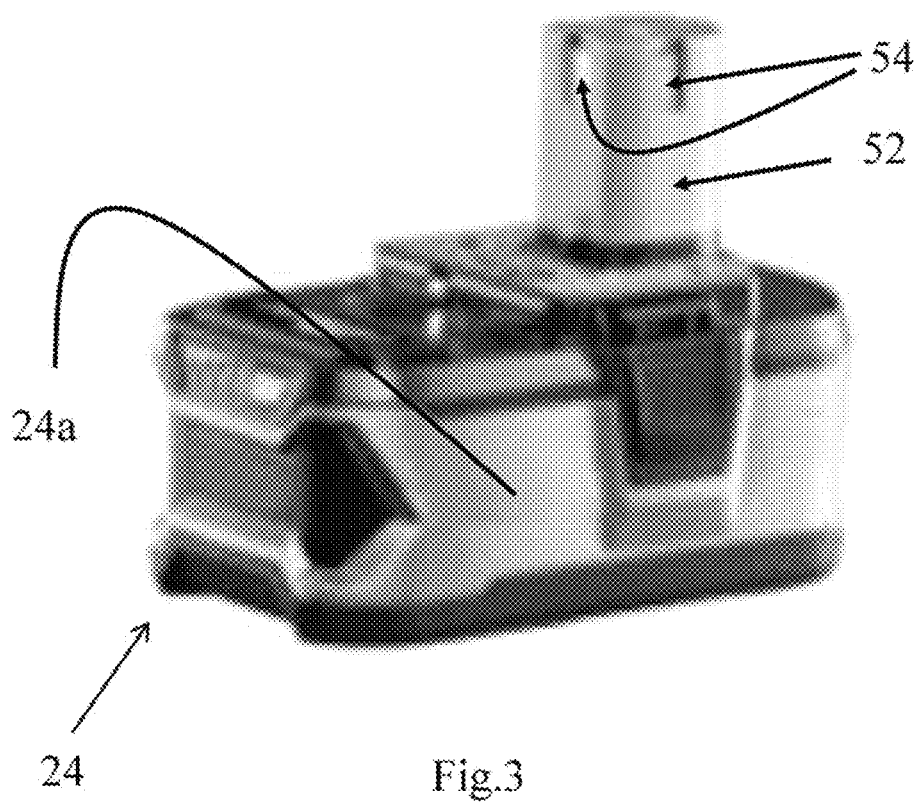

Turning now to FIGS. 2-3, which show examples of battery packs that can be used with the charger 20 in FIG. 1. In particular. FIG. 3 shows a first battery pack 24 which is a rechargeable battery pack. The first battery pack 24, whose output voltage is approximately 18V, is a battery pack attached to a portable electric power tool of relatively small size. The first battery pack 24 contains a body 24a, and a protruded part 52 extending perpendicularly from the body 24a. On the end of the protruded part 52 there are electrical terminals 54 configured. The protruded part 52 and its electrical terminals 54 is also called a first interface of the first battery pack 24.

Figure 4:
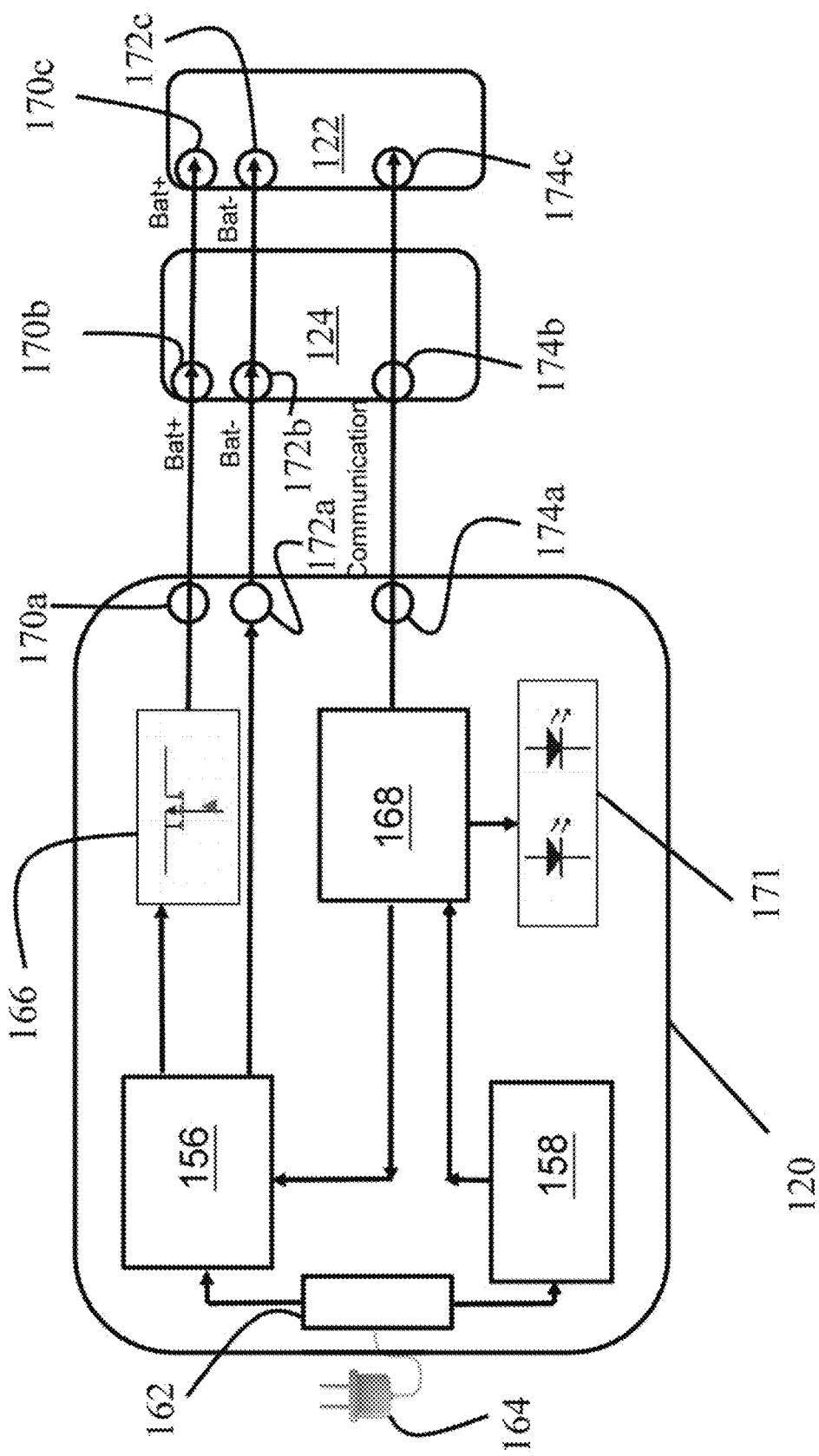
FIG. 4 is a schematic diagram showing the internal circuit of a battery charger and its connection to two battery packs according to another embodiment of the present invention.

FIG. 4 shows a second battery pack 22 which is a rechargeable battery pack. The second battery pack 22, whose output voltage is approximately 36V, is a battery pack attached to a portable electric power tool of relatively large size. The second battery pack 22 contains a body 22a, and a second interface 48 at the bottom of the body 22a. The second interface 48 contains a pair of opposite slots 50 on its two sides, and the two slots 50 run parallel to each other. The second interface 48 also contains electrical terminals (not shown) at one of its end for coupling to electrical contacts on the battery charger 20.

Now turning to the principle of operation of the charger 20 and the first and second battery packs 24, 22. The charger 20 is able to accommodate and charge either the first battery pack 24, or the second battery pack 22, but not both simultaneously. Suppose that initially there is no battery pack mounted on the charger 20, then if the user wants to charge the first battery pack 24, he/she moves the first battery pack 24 so that the protruded part 52 of the first battery pack 24 is aligned with the opening 28 of the charger 20 as shown in FIG. 1. Then, the user presses the first battery pack 24 onto the charger 20 along the direction denoted by arrow 46. The first battery pack 24 is then both mechanically and electrically connected to the charger 20, and can be charged by the latter. Removal of the first battery pack 24 from the charger 20 follows reversed steps as mentioned above.

On the other hand, suppose that initially there is no battery pack mounted on the charger 20, then if the user wants to charge the second battery pack 22, he/she moves the second battery pack 22 so that the second interface 48 of the second battery pack 22 is aligned with the two ribs 40 on the charger 20. The user then slides the second battery pack 22 by making the two ribs 40 received into the two slots 50 respectively so that the second battery pack 22 is only allowed to move along the direction denoted by arrow 44. Then, the user keeps sliding the second battery pack 22 onto the charger 20 until electrical terminals on the second interface 48 is firmly contacted with the electrical contacts in the terminal block 40. The second battery pack 22 is then both mechanically and electrically connected to the charger 20, and can be charged by the latter. Removal of the second battery pack 22 from the charger 20 follows reversed steps as mentioned above.

Turning now to FIG. 4, Which shows the internal circuit of a battery charger 120 and its electrical connections to two battery packs 124 and 122 respectively. The internal circuit as shown in FIG. 4 for example may be implemented in the charger shown in FIG. 1. The battery charger 120 contains a power plug 164 adapted to connected to an external socket (not shown) which is connected with the mains electricity, so that the battery charger 120 could obtain power supply therefrom. The power plug 164 is connected with a junction module 162 which splits the incoming AC electricity from the power plug 164 to two part, one to the AC/DC converter 156, and another one to the standby power module 158. The standby power module 158 connects to a microcontroller 168 to provide power necessary to operate the microcontroller 168. On the other hand, the AC/DC converter 156 is connected, via a switch 166, to the positive and negative output terminals 170a and 172a of the charger 120, so as to provide DC power to the output terminals 170a and 172a for charging the first battery pack 124 or the second battery pack 122. The switch 166 is a MOSFET controlled by the microcontroller 168, and in other words, the microcontroller 168 controls the power supply path from the charger 120 to the battery pack 124 or 122. The AC/DC converter 156 is also controlled by the microcontroller 168 so that its output can be altered. The microcontroller 168 is also connected with a LED module 171 and drives the latter to indicate a working status of the charger 120.

FIG. 4 shows a positive output terminal 170a, a negative output terminal 172a, and a communication terminal 174a. Note that although there is only one positive output terminal 170a, one negative output terminal 172a, and one communication terminal 174a shown, in the charger 120 actually there can be more than one of each of these terminals. In these cases the multiple positive output terminals 170a are electrically connected to each other, but physically they are configured as separate terminals in separate locations. Similarly, the multiple negative output terminals 172a are electrically connected to each other, but physically they are configured as separate terminals in separate locations. Similarly, the multiple communication terminals 174a are electrically connected to each other, but physically they are configured as separate terminals in separate locations. Correspondingly, on the first battery pack 124, there is a positive terminal 170b, a negative terminal 172b, and a communication terminal 174b. On the second battery pack 122, there is a positive terminal 170c, a negative terminal 172c, and a communication terminal 174c. Although all the corresponding positive terminals 170a, 170b and 170c of the charger 120, the first battery pack 124, and the second battery pack 122 are shown to be connected, in fact at any time only one of the positive terminals 170b and 170c will be connected to the positive terminal 170a on the charger 120, since only one of the first battery pack 124 and the second battery pack 122 can be connected to the charger 120 at any time. Similarly, although all the corresponding negative terminals 172a, 172b and 172c of the charger 120, the first battery pack 124, and the second battery pack 122 are shown to be connected, in fact at any time only one of the negative terminals 172b and 172c will be connected to the negative terminal 170b on the charger 120. Similarly, although all the corresponding communication terminals 174a, 174b and 174c of the charger 120, the first battery pack 124, and the second battery pack 122 are shown to be connected, in fact at any time only one of the communication terminals 1741) and 174c will be connected to the communication terminal 1741) on the charger 120.

In the embodiment shown in FIG. 4, the microcontroller 168 is able to retrieve status information of the first battery pack 124 or the second battery pack 122 through the communication terminal 174a, The status information for example include the demanded charging current by the battery pack and supported highest voltage. With such status information the microcontroller 168 then controls the AC/DC converter 156 to output required charging voltage/current to the first battery pack 124 or the second battery pack 122. For example, the AC/DC converter 156 may outputs a 18V voltage for the first battery pack 124, and a 36V voltage for the second battery pack 122.

Figure 5:
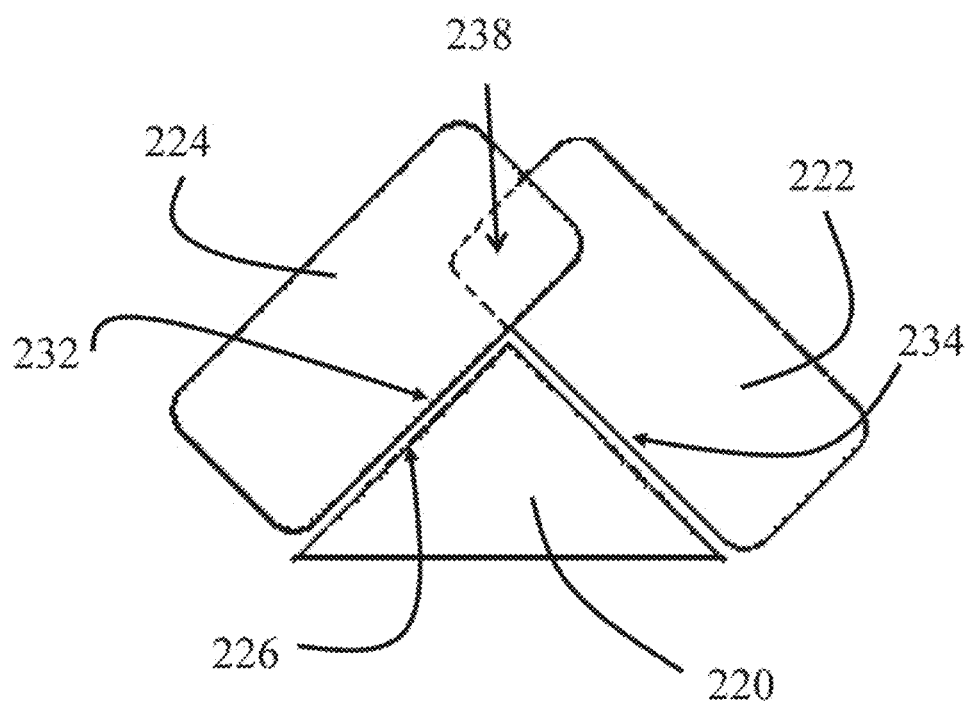
FIG. 5 shows an illustration of two battery packs interfering with each other when installed in a battery charger according to another embodiment of the present invention.

Turning now to FIG. 5, which illustrates spatial relationship of two battery packs 224 and 222 that are adapted to be installed on a battery charger 220. It should be noted that FIG. 5 shows interference between the battery packs 224 and 222, and in practice these two cannot be installed at the same time. The battery charger 220 has a receiving area formed on a top side 226 in which the first battery pack 224 or the second battery pack 220 can be selectively received in such a way that the first battery pack 224 is accommodated in a first region 232 and the second battery pack 222 is accommodated in a second region 234. The first region 232 and the second region 234 are formed along two surfaces of the top side 226, and the two surfaces form a substantially right angle with each other. As a result, the first battery pack 224 and the second battery pack 222 in their installed position will also be forming a substantially right angle. However, as there is an overlapping space 238 which is required by both the first battery pack 224 and the second battery pack 222, this overlapping space 238 creates an interference which prevents the first battery pack 224 and the second battery pack 222 from being installed at the same time.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, the charger 20 shown in FIG. 1 and the two battery packs 22, 24 are shown to have specific interfaces, geometrical features and shapes. However, the present invention is not limited by these particular configurations. Skilled persons in the art should understand that other types of battery charger and battery packs, and/or different battery interface and mounting method, etc., can be applied under the spirit of the present invention, as long as a single battery charger provides two or more interfaces for two or more different types of battery packs.

In addition, FIG. 4 above shows communication terminals configured on the battery charger and battery packs for the battery charger to retrieve status information from the battery chargers. However, it is possible that in modification of the embodiments, there is no communication terminal at all. Rather, the charger may detect the presence of a particular battery pack which is received and electrically connected with the charger, and then select an appropriate charging method for the particular battery pack. The charger therefore would pre-store the charging methods/parameters for different types of battery packs.

What we claim:

1. A charger adapted to charge at least one selected from a group consisting of a first battery pack and a second battery pack, the first battery pack and the second battery pack having respectively a first interface and a second interface being substantially different from each other, the charger comprising:
    a housing including a receiving area in which the first battery pack and the second battery pack can be selectively received in such a way that the first battery pack is accommodated in a first region and the second battery pack is accommodated in a second region;
    wherein the first region includes a cavity formed on a top side of the charger in a direction parallel to an intended insertion direction of a first battery pack; and
    wherein the second region includes one or more ribs protruding from one or more features on the top side of the charger configured to be received by one or more corresponding slots of the second battery pack.

2. The charger of claim 1, wherein the first region and the second region respectively accommodate the first battery pack and the second battery pack in a first orientation and a second orientation, and further wherein the second orientation being substantially parallel to the top side of the charger and the first orientation being substantially perpendicular to the second orientation.

3. The charger of claim 2 wherein the cavity is adapted to receive a portion of the first battery pack.

4. The charger of claim 3 further comprising:
    a first set of electrical contacts exposed to the first region and adapted to electrically contact with corresponding terminals on the first battery when the first battery is completely received in the receiving area; and
    a second set of electrical contacts exposed to the second region and adapted to electrically contact with corresponding terminals on the second battery when the second battery is completely received in the receiving area;
    wherein the first set of electrical contacts is located in the cavity.

5. The charger of claim 1 further comprising a charging control circuit housed in the housing; the control circuit adapted to retrieve status information of the first battery pack or the second battery pack received in the receiving area, and to control a charging process depending on the status information.

6. A kit comprising the first battery pack, the second battery pack, and the charger according to claim 1.

7. The kit of claim 6, wherein the first battery pack and the second battery pack are configured for use in power tools.

8. The kit of claim 7, wherein the first battery pack and the second battery pack have different rated voltages.

9. The kit of claim 8, wherein the first battery pack and the second battery pack have rated voltages of 18V and 36V respectively.

10. The charger of claim 2, wherein the one or more ribs are in a parallel orientation with the second orientation.

11. The charger of claim 10, further comprising a set of electrical contacts adapted to electrically contact with corresponding terminals on at least one selected from a group consisting of the first battery and the second battery.

12. The charger of claim 5, wherein the status information includes a demanded charging current.

13. The charger of claim 5, wherein the status information includes a supported voltage.

14. The charger of claim 5, wherein the charging process is controlled by controlling a converter.

\* \* \* \* \*